United States Patent Office 3,391,179
Patented July 2, 1968

3,391,179
2,2'-BIS-(HEXAFLUOROISOPROPYL)DIPHENATE
Jerome Hollander and Cyril Woolf, Morristown, N.J., assignors to Allied Chemical Corporation, New York, N.Y., a corporation of New York
No Drawing. Filed Mar. 25, 1964, Ser. No. 354,768
1 Claim. (Cl. 260—475)

ABSTRACT OF THE DISCLOSURE

A compound having the formula:

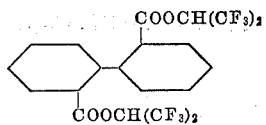

---

This invention relates to the compound, 2,2'-bis-(hexafluoroisopropyl) diphenate, and its preparation.

In view of its thermal and oxidative stability, 2,2'-bis-(hexafluoroisopropyl) diphenate is useful as a heat transfer fluid and as a high temperature lubricant.

An object of this invention is to provide a new and useful compound, 2,2'-bis-(hexafluoroisopropyl) diphenate. A further object is to provide a novel process for the preparation of this compound. Other objects and advantages will become apparent hereinafter.

In accordance with the invention 2,2'-bis-(hexafluoroisopropyl) diphenate

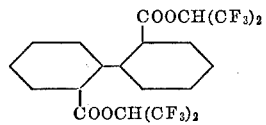

is produced by admixing the di-acid chloride of 2,2'-diphenic acid with hexafluoroisopropyl alcohol as illustrated by the following generalized equation:

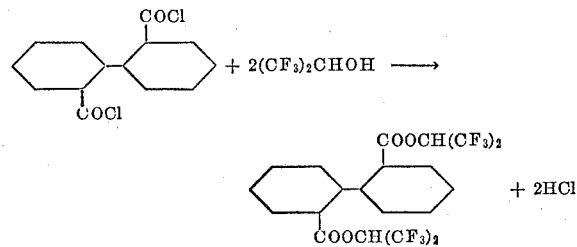

The process for the preparation of 2,2'-bis-(hexafluoroisopropyl) diphenate can be conducted by admixing the reactants in a reaction vessel such as a glass-lined container optionally equipped with stirring, refluxing, and heating means. Practically, solutions of the reactants are used, but melts can be used if desired. Conducting the reaction in a liquid state or liquid medium enhances the reaction by providing effective surface contact between the reactants. A solution of the di-acid chloride of 2,2'-diphenic acid, a known compound, in pyridine or another solvent such as quinoline or N-dimethylaniline can be added to a solution of hexafluoroisopropyl alcohol in similar solvents. Hexafluoroisopropyl alcohol is prepared by the process shown in the copending application of Jerome Hollander and Cyril Woolf, Ser. No. 207,382, filed July 3, 1962. The ratio of each reactant to solvent in parts by weight can range from about 1:10 to about 8:1 to insure a high degree of facility in handling the reactants, but criticality is not involved.

The molar ratio of the reactants can be varied over a broad range. 1 to 4 mols of hexafluoroisopropyl alcohol per mol of the di-acid chloride of 2,2'-diphenic acid can be used, and, preferably, about 1.8 to about 2.5 mols of alcohol per mol of chloride. 2 mols of alcohol per mol of diacid chloride is optimum.

The reaction can be conducted over a wide range of temperatures, ranging from about 0° C. to about 70° C. The preferred temperature range is from about 10° C. to about 40° C. The reaction can also be conducted initially at room temperature and then at the reflux temperature of the reaction mixture, which ranges from 115° C. to above 200° C. depending on the solvent used. The reaction time also covers a wide range from about 1 to about 20 hours and, usually, from about 4 to about 8 hours. Atmospheric pressure is preferable and most practical, but super-atmospheric and sub-atmospheric pressures can be used. The atmosphere surrounding the reactants can be air or an inert gas.

For best results stirring and refluxing are used during the process. The product can be separated by pouring the reaction mixture into hydrochloric acid to dissolve the solvent base. The amount of hydrochloric acid which can be used is preferably in excess of the amount of pyridine or other tertiary amine solvent, a typical amount being in the ratio of 3 mols of acid to 1 mol of solvent base. The normality of the hydrochloric acid used can be about 1 to about 6 N and preferably is about 2 to about 4 N. On pouring the reaction mixture into the hydrochloric acid, the product, a brown solid precipitates out.

In order to obtain a product having a high degree of purity, the precipitate is dissolved in ether or another volatile solvent such as tetrahydrofuran. The remaining aqueous layer is then extracted with ether or similar solvents. The solution of the precipitate and the ether extract are combined and washed with water, hydrochloric acid, water, dilute sodium carbonate solution or other dilute basic solution, and washed again with water. After the consecutive washings, the solution may be dried over anhydrous sodium sulfate or other drying agents such as anhydrous magnesium sulfate. Then the ether or other volatile solvent is evaporated under reduced pressure. Recrystallization is suggested for further purification.

In the following examples parts and percentages are by weight.

Example I

To a solution of 37 parts of hexafluoroisopropyl alcohol in 100 parts of pyridine, a solution of 28 parts of the di-acid chloride of 2,2'-diphenic acid in 85 parts of pyridine was added with stirring. The mixture was stirred at room temperature for ¾ of an hour and then at reflux for 5½ hours. The reaction mixture was then poured into one liter of 3 N hydrochloric acid. The brown solid product which precipitated out was dissolved in ether. The aqueous layer was extracted with ether and the ether extracts combined with the ether solution of the solid. This combination was washed with water, 3 N hydrochloric acid solution, water, dilute sodium carbonate solution, and water again, in that order. After drying over anhydrous sodium sulfate, the ether was evaporated off at reduced pressure. 43.6 parts of a brown solid remained. Recrystallization from glacial acetic acid yielded 34.9 parts of 2,2'-bis(hexafluoroisopropyl) diphenate as a light tan solid, melting point 75–76° C.

*Analysis.*—Calculated for $C_{20}H_{10}F_{12}O_4$: F, 42.1%. Found: F, 43.0%. The infra-red spectrum confirmed the compound was a diester (>CO absorption) with no COOH groups and showed aromaticity.

Example II

The product, 2,2'-bis-(hexafluoroisopropyl) diphenate, of Example 1 was tested for thermal stability at 300° C. for 24 hours under nitrogen. Although a dark brown deposit came out on the sides of the Pyrex container in which the solid was tested, the liquid melt remained clear with a very pale yellow tint. The solid recovered after cooling was identified as the product of Example 1, used initially.

Example III

Product 2,2'-bis-(hexafluoroisopropyl) diphenate recovered from Example 2 was heated for 5 hours at 400° C. in the same manner as in Example 2 with the same result.

We claim:
1. A compound having the formula:

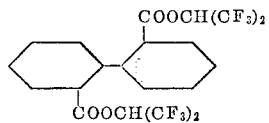

References Cited

Murphy et al.: Chem. Abstracts, vol. 54, pp. 9836–9837a (1960).

Migrdichian: Organic Synthesis, Reinhold, N.Y. 1957, p. 319.

Ravner et al.: Jour. of Chem. and Eng. Data, vol. 8, No. 4, pp. 591–593, 1963.

LORRAINE A. WEINBERGER, *Primary Examiner.*

T. G. GALLOWAY, *Assistant Examiner.*